UNITED STATES PATENT OFFICE 2,204,148

METHOD OF TREATING SULPHUR BEARING COALS

Joseph C. Nelms, East Cleveland, Ohio

No Drawing. Application July 16, 1936,
Serial No. 90,895

9 Claims. (Cl. 266—2)

This invention relates to a process of treating coal and particularly to the treatment of coals having a sulphur content in excess of 1½% or 2% by weight preparatory to gasification thereof in producers for providing producer gases for use in heating and heat treating of steel.

Heretofore, such coal, commonly referred to as "high sulphur" coal, have been considered unsuitable for the production of producer gases used in the heating and heat treating of steel wherein the products of combustion of the producer gases evolved from the coal come into direct contact with the steel to be heat treated.

The use of coal having a sulphur content of 2% or more for the making of producer gas which is used in the heating and heat treatment of steel provides a producer gas which, when the steel is heated thereby and directly subjected to the products thereof, at the temperatures customarily employed in industrial heat treatments of steel, causes formation of sulphide scale on the steel, beneath which scale the metal is corroded. Examination of steels heated with this producer gas shows not only that the scale has fused but also that it has run downwardly over the surface of the steel, leaving very pronounced and deep pits and indentations where the molten scale has melted away part of the main body of the material. Not only is the useful amount of steel decreased as a result of this scale loss and the indentations, but also, if the steel is subjected to such gases for an appreciable period, a large amount of the main body of the metal melts and corrodes, greatly decreasing the resultant useful tonnage. These effects are particularly pronounced in the case of low carbon nickel molybdenum steel heated by direct contact with the products of the producer gas from such high sulphur coal.

One of the principal objects of the present invention is to render substantially innocuous to steel being heated or heat treated thereby, the sulphur content of producer gases produced from sulphur bearing coal.

Another object is to condition the coal, preparatory to use in gas producers, so that the gases derived therefrom and applied to the steel for heat treating the same at temperatures ordinarily employed for heat treatment of the steel, alter the physical characteristics of the scale of the steel in a manner such that the resultant scale does not flow and corrode the metal.

A more specific object is to so treat the coal that the resultant producer gases when applied to steel produce only a relatively thin scale and do not otherwise deleteriously affect the metal.

Other objects and advantages will become apparent from the following specification wherein exemplary treatments of the coal and gases produced thereby are described for purposes of illustration.

In the manufacture of producer gases from coal for industrial purposes of this nature, the customary practice is to place the coal in a gas producer wherein the burning coal is subjected to air and steam for generating the producer gas. This gas is then discharged from the producer, mixed with air, and passed into a suitable heater or furnace wherein temperatures in excess of 1500° Fahrenheit may be obtained, the products of imperfect combustion of the gases and an excess of producer gas being used to maintain a reducing atmosphere in the furnace.

When coals containing an appreciable amount of sulphur are utilized in this manner, hydrogen sulphide and other sulphurous compounds are present in the resultant gases in sufficient quantities to cause the formation on the steel of scale which appears to begin to form as low as 1500° and starts to melt at about 2000° Fahrenheit and melts and flows at temperatures as low as 2100° Fahrenheit. This scale is very adherent and is accompanied by pitting and corrosion of the metal which not only causes the direct losses above referred to, but also renders the metal objectionable for subsequent processing. For example, the pits and indentations are often deep and cannot be removed readily or economically, and also are scale retaining pockets. Since such gases are usually utilized for reheating the steel before rolling, the scale adhering to the steel and retained in this manner becomes imbedded in the metal in the rolling process, often rendering the metal unsuitable for use. This condition is known in mill practise as "fish-scaling".

Coal having over one and one-half percent of sulphur content by weight produces gases having as high as one-half percent hydrogen sulphide by volume, which is sufficient to cause the sulphide scales above described, which do not flake off in the manner of the ordinary oxide scales.

After many tests with various chemicals to offset the corroding action of the hydrogen sulphide and sulphurous compound content of the gases on the steel, it was found that hydrochloric acid gas mixed with such producer gases was very effective. Hydrochloric acid gas, however, in commercial forms, is too expensive for practical use, but it may be obtained in an economical manner by the addition to the coal of certain amounts of calcium chloride or magnesium chloride or both. Both calcium chloride and magnesium chloride, at certain temperatures and in the presence of steam and air, which latter are necessarily present in the gases evolved in the producer, liberate hydrochloric acid gas, although the magnesium chloride is much faster in effecting this liberation than is calcium chloride. The calcium chloride is comparatively cheap and in the unrefined or commercial state often includes a sufficient amount of magnesium chloride to obtain the beneficial effects resulting from the initial rapid liberation of hydrochloric acid gas by the magnesium chloride.

With coal containing sulphur of one and one-half percent or more, it is preferable to use calcium chloride or magnesium chloride or a mixture of the two in the amount of about 1% of the weight of the coal, though from one-half to three-fourths percent is satisfactory in some instances. When both calcium chloride and magnesium chloride are used together, they are preferably used in the ratio of five parts of calcium chloride to one part of magnesium chloride.

In applying the chlorides, or either of them, to the coal, it is important that the chloride salt be uniformly distributed and so incorporated as to remain during handling and gasification. These effects are obtained by dissolving the chlorides in water to form a bath and passing the coal through the bath, the bath being well agitated continuously and the coal agitated concurrently so that the bath thoroughly wets and mixes with the coal, not only uniformly coating the outer exposed surfaces of the pieces of coal but also entering, by capillary action, all interstices, fissures, and crevices of the pieces. The most effective manner is to pass the coal continuously through the bath on an especially constructed perforated conveyor. By this procedure, the chloride salts are deposited uniformly on the surface and in the interstices, fissures, and the like existing in the pieces.

Several advantages result from this manner of applying the treatment. In producers, it is desirable to use pieces of coal sized from about 2″x4″ to 2″x5″. Such pieces do not present a large outer surface area in proportion to volume, and the requisite amount and distribution of chloride salt might not be provided merely by coating the outer surface. When the coal is subjected to the present treatment and method of application, however, not only is an adequate amount of chloride salt retained but it is also more uniformly distributed throughout the coal pieces so that it is supplied more uniformly in relation to the gasification of the coal. Another advantage of thus impregnating the pieces is that the chloride salt will not be so readily removed or washed away upon intervals of exposure to rain and snow.

The percentages of the chlorides to the coal are sufficient, regardless of the size of the coal. If the coal is exceedingly fine, the concentration of the bath may necessarily be less, or if the coal is in comparatively large pieces, the concentration of the bath may be greater, so that, regardless of the surface area of the coal, the total amount of chlorides will be provided in the resulting treatment.

The coal is preferably treated in this manner and stored so as to be protected from the weather as rain or water is apt to wash away some of the chlorides if the coal is exposed to the weather for long periods of time. If it is necessary to transport the coal after treatment, however, a suitable fixation agent may be added to the bath to prevent any of the coating from being washed away.

Since calcium chloride causes destructive corrosion of steel, it is usually desirable to add to the chlorides an amount of sodium chromate equal to $\frac{1}{10}$% to $\frac{1}{2}$% of the weight of the chlorides, so that, in event the calcium chloride is washed off the coal onto the steel storage bins, cars or steel rails of the transporting railway, the corroding effect is substantially eliminated.

The present practice in the use of producer gases from high sulphur coals is to add excess air to the gases so as to create a very much heavier coating of oxide scale than is customarily present, thereby enclosing the piece being treated with such a heavy coating of oxide scale that no appreciable amount of sulphur gases reach the main body of the material. This, however, necessitates a considerable loss of useful material whereas by treating the coal by the new method herein described, the low melting scales and corrosion are substantially eliminated and no appreciable losses due to oxide scales, other than those customarily present in low-sulphur coal, result.

With coal so treated, there is no material reduction or change of hydrogen sulphide or other sulphur compounds in the producer gases. Nevertheless, the treatment alters the characteristics of the scale, forming scale which does not appreciably fuse at 2400° F., whereas, with producer gases from untreated coal, with the same sulphur content, a scale results which starts to melt at 2000° F., and flows at 2100° F. and is very adherent, and under which the steel is corroded. Again with treated coal, such scale as is formed appears to be less adherent and more easily removable from the steel.

Experience has demonstrated that small amounts of the treatment had no appreciable effect on the scale but when one percent of the treatment per ton of coal having a sulphur content of 2½% to 3% was employed, the results described herein were obtained. Obviously, by subjecting coal to the treatment herein described, a great saving in useful tonnage of metal is effected.

Ordinarily high sulphur coals cause no seriously deleterious effect below 1500° Fahrenheit, the great damage being done at temperatures of 2000° Fahrenheit or more.

In those instances in which the sulphur content exceeds three and a half percent by weight of the coal, the amount of chloride salt added may be proportionately increased over the limits recited. In fact a slight excess of chloride relative to the sulphur is desirable as it allows a factor of safety in the event some particular portion of the coal should contain more sulphur than expected.

When an excess amount of chloride is added to the coal, there is apparently no deleterious effect on the steel treated by the resultant producer gases and the excess is objectionable only in the resultant waste of chloride salts.

The present processing treatment is not to be confused with treatments of coal for purposes of combustion in boiler furnace power installations and the like wherein oxidizing atmospheres exist. On the contrary, it contemplates a treatment of relatively high sulphur coal with suitable chloride salts preparatory to use of the coal in manufacturing producer gas wherein, during the gasification of the coal, a reducing atmosphere, and not an oxidizing atmosphere, is maintained.

It should be noted also that the present treatment is not to alter or change the sulphur content of the gases but only to change the effect of such sulphur content on the steel which is heated or heat treated by direct firing with the resultant producer gases. Even in the latter instance, a substantially reducing atmosphere is maintained in the steel treating furnace by supplying an excess of producer gas relative to the air supply for sustaining combustion thereof.

I am aware that calcium chloride has heretofore been used on coal but only in much smaller quantities and for the purpose of settling dust or for effects produced in boiler furnaces wherein the coal is not subjected to gasification but is burned in an oxidizing atmosphere.

Having thus described my invention, what I claim is:

1. A process of treating steel with relatively high sulphur coal comprising making from the coal producer gas having sulphur compounds therein, heating the steel therewith in a reducing atmosphere by direct contact of the products of combustion of the producer gas and the sulphur compounds therein with the steel to temperatures in excess of 1500° F. and maintaining in the producer calcium chloride in amounts of from seven eighths to two percent, by weight, of the coal.

2. A process of heating steel with relatively high sulphur coal comprising making from said coal producer gas having sulphur compounds therein, heating steel therewith in a reducing atmosphere by direct contact of the products of combustion of the producer gas with the sulphur compounds therein to temperatures in excess of 1500° F. and maintaining in the producer calcium chloride and a lesser amount of magnesium chloride, the total amount of the chlorides being sufficient to render the sulphur compounds in the producer gas innocuous to the steel at said temperatures.

3. A process of heating steel with relatively high sulphur coal which comprises subjecting the coal intimately to a bath of water and chloride salts, soluble therein, in a manner to cause the coal to become thoroughly wetted therewith on the outer surface and in the interstices and fissures of the coal and to retain the salts of the bath therein and thereon in amounts in excess of seven eighths percent, by weight, of the coal, making from the treated coal producer gas having sulphur compounds therein and heating steel in a reducing atmosphere with said producer gas having said sulphur compounds therein by direct contact with the products of combustion thereof to temperatures in excess of 1500° F.

4. The process of heating steel to temperatures in excess of 1500° F. with high sulphur coal which comprises uniformly depositing chloride salts on and in the fissures and interstices of the coal in sufficient amounts to render innocuous to the steel the sulphur compounds in producer gases made from the coal, gasifying the treated coal in the producer and thereby providing producer gas having sulphur compounds therein and heating the steel in a reducing atmosphere with the producer gas having sulphur compounds therein by direct contact of the products of combustion of the producer gas with the steel to temperatures in excess of 1500° F.

5. A process of heating steel to temperatures in excess of 1500° F. with relatively high sulphur coal comprising making from said coal producer gas having sulphur compounds therein, burning the gas and heating the steel in a reducing atmosphere by direct contact with the products of combustion of the gas with the sulphur compounds therein at temperatures in excess of 1500° F. and, concurrently with the gasification of the coal, maintaining on the coal particles and uniformly distributed therethrough a chemical agent capable of liberating hydrochloric acid gas upon gasification of the coal, and said chemical agent being in excess of one percent, by weight, of the coal.

6. The process of heating steel with high sulphur coal comprising mixing with and distributing uniformly throughout the coal a quantity of calcium chloride salts in the ratio of three fourths percent to two percent, by weight, of the coal, gasifying the coal in a producer and heating steel in a reducing atmosphere with the resultant producer gases by direct contact of the products of combustion of the gases with the steel to temperatures in excess of 1500° F.

7. The process of heating steel with high sulphur coal to temperatures in excess of 1500° F. which comprises gasifying the coal in a producer, mixing with the producer gases, preparatory to contact thereof with the steel, an amount of hydrochloric acid gas sufficient to render sulphur compounds in the gas substantially innocuous to steel heated in a reducing atmosphere by direct contact with the products of combustion thereof, heating the steel with said mixture and by direct contact of the products of combustion thereof with the steel to temperatures in excess of 1500° F.

8. The process of heating steel with high sulphur coal to temperatures in excess of 1500° F. comprising making producer gas from said coal, whereby the gas has a hydrogen sulphide content in excess of one half of one percent by volume, heating steel in a reducing atmosphere by direct contact with the products of combustion of the producer gas to temperatures in excess of 1500° F. and rendering the gases and hydrogen sulphide contained therein substantially innocuous to the steel heated to said temperatures by mixing with the gases, during gasification, a uniformly distributed amount of hydrochloric acid gas.

9. The process of heating steel with coal having a sulphur content in excess of one and one half percent, by weight, of the coal, comprising making from said coal producer gas having sulphur compounds therein, heating the steel in a reducing atmosphere by direct contact of the products of combustion of said gas and sulphur compounds therein to a temperature in excess of 1500° F., rendering the producer gas, derived from the coal, innocuous to the steel at said temperatures by maintaining intimately and uniformly distributed throughout the coal, during gasification thereof, chloride salt in amounts of from three fourths to two percent, by weight, of the coal.

JOSEPH C. NELMS.